United States Patent
Wang et al.

(10) Patent No.: US 12,392,321 B2
(45) Date of Patent: Aug. 19, 2025

(54) SHUTDOWN MAINTENANCE METHOD AND APPARATUS FOR WIND TURBINE, AND DEVICE FOLLOWING A FAILURE

(71) Applicant: GOLDWIND SCIENCE & TECHNOLOGY CO., LTD., Xinjiang (CN)

(72) Inventors: Jingyuan Wang, Beijing (CN); Yan Li, Beijing (CN); Pin Lv, Beijing (CN); Qiang Li, Beijing (CN); Mingrui Qi, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 18/575,436

(22) PCT Filed: Sep. 26, 2022

(86) PCT No.: PCT/CN2022/121472
§ 371 (c)(1),
(2) Date: Dec. 29, 2023

(87) PCT Pub. No.: WO2023/231247
PCT Pub. Date: Dec. 7, 2023

(65) Prior Publication Data
US 2024/0318629 A1 Sep. 26, 2024

(30) Foreign Application Priority Data
May 31, 2022 (CN) .......................... 202210611961.0

(51) Int. Cl.
*F03D 7/02* (2006.01)
*F03D 17/00* (2016.01)
*F03D 80/50* (2016.01)

(52) U.S. Cl.
CPC ......... *F03D 7/0264* (2013.01); *F03D 7/0268* (2013.01); *F03D 17/014* (2023.08);
(Continued)

(58) Field of Classification Search
CPC .... F03D 7/0264; F03D 7/0268; F03D 17/014; F03D 80/50; F03D 80/505; F05B 2260/31
See application file for complete search history.

(56) References Cited

U.S. PATENT DOCUMENTS 8,246,308 B2 * 8/2012 Numajiri ................. F03D 80/50
416/169 R
8,397,382 B2 * 3/2013 Anasis .................... F03D 80/50
29/889.1
(Continued)

FOREIGN PATENT DOCUMENTS

CN 103967704 A 8/2014
CN 104603453 A 5/2015
(Continued)

OTHER PUBLICATIONS

English translation of CN112443453A (Year: 2021).*
(Continued)

*Primary Examiner* — Courtney D Heinle
*Assistant Examiner* — Esley Le Fisher
(74) *Attorney, Agent, or Firm* — Frank Gao, Esq.

(57) ABSTRACT

This application discloses a method, device, and apparatus for maintaining a wind turbine generator plant, which relates to the field of wind power generation. The method includes determining a failure of the wind turbine generator plant when the wind turbine generator plant enters a shutdown maintenance mode; determining a maintenance wind speed corresponding to the failure; adjusting one of blades of the wind turbine generator plant to reach a predetermined azimuth angle and lock an impeller of the wind turbine gen- (Continued)

erator plant to maintain the wind turbine generator plant in a case where the failure belongs to a first type of failure and a real-time wind speed obtained is less than or equal to the maintenance wind speed corresponding to the failure, the first type of failure comprising a failure that requires to lock the impeller for maintenance and the predetermined azimuth angle being a different integral multiple of 30°.

12 Claims, 6 Drawing Sheets

(52) U.S. Cl.
CPC ........... *F03D 80/50* (2016.05); *F03D 80/505* (2023.08); *F05B 2260/31* (2020.08)

(56) References Cited

U.S. PATENT DOCUMENTS

| | | | | |
|---|---|---|---|---|
| 8,764,393 | B2* | 7/2014 | Von Mutius | F03D 7/0264 416/37 |
| 8,944,766 | B2* | 2/2015 | Nielsen | F03D 80/00 416/169 R |
| 9,181,925 | B2* | 11/2015 | von Mutius | F03D 7/0268 |
| 9,784,241 | B2* | 10/2017 | Blom | F03D 7/045 |
| 10,927,812 | B2* | 2/2021 | Kammer | F03D 7/0264 |
| 11,549,494 | B2* | 1/2023 | Christensen | F03D 80/50 |
| 11,959,460 | B2* | 4/2024 | Hammerum | F03D 7/0264 |
| 2011/0280725 | A1 | 11/2011 | Taylor et al. | |
| 2016/0053745 | A1* | 2/2016 | Blom | F03D 7/0264 416/1 |
| 2016/0068373 | A1 | 3/2016 | Chin et al. | |
| 2020/0208609 | A1* | 7/2020 | Krabbe | F03D 7/0244 |
| 2020/0263662 | A1 | 8/2020 | Kammer | |

FOREIGN PATENT DOCUMENTS

| | | | | |
|---|---|---|---|---|
| CN | 105508149 | A | | 4/2016 |
| CN | 207195103 | U | | 4/2018 |
| CN | 108457798 | A | | 8/2018 |
| CN | 109707563 | A | | 5/2019 |
| CN | 112443453 | A | * | 3/2021 ............. F03D 17/00 |
| CN | 112443453 | B | | 9/2021 |
| CN | 215860625 | U | | 2/2022 |

OTHER PUBLICATIONS

The International Search Report mailed Feb. 9, 2023; PCT/CN2022/121472.

Zhiyu Jiang, et al; "Dynamic response analysis of wind turbines under blade pitch system fault, grid loss, and shutdown events", Wind Energy, 2014; 17: 1385-1409; Published online Jun. 13, 2013; 26 pages.

Erin E. Bachynski, et al; "Dynamic analysis of floating wind turbines during pitch actuator fault, grid loss, and shutdown", Energy Procedia 35 (2013) 210-222; 13 pages.

N.C.K. Pawsey; "Development and Evaluation of Passive Variable-Pitch Axis Wind Turbines", A Thesis Submitted For The Degree Of Doctor Of Philosophy, Nov. 2002; 398 pages.

Australia Examination Report No. 2 dated Apr. 8, 2025; Appln. No. 2022461855.

European Search Report dated Nov. 8, 2024; Appln. No. 22944555.6.

First Australian Examination Report No. 1; Appln. No. 2022461855; dated Jan. 8, 2025.

The Extended European Search Report dated Nov. 8, 2024; Appln. No. 22944555.6.

* cited by examiner

SHUTDOWN MAINTENANCE METHOD AND APPARATUS FOR WIND TURBINE, AND DEVICE FOLLOWING A FAILURE

CROSS-REFERENCES TO RELATED APPLICATIONS

This application is a National Stage of International Application No PCT/CN2022/121472, filed on Sep. 26, 2022, which claims priority to Chinese patent application No. 202210611961.0 filed on May 31, 2022, both of which are hereby incorporated by reference in their entireties.

FIELD

This application relates to the field of wind power generation and, in particular, to a method, device, and apparatus for maintaining a wind turbine generator plant.

BACKGROUND

A wind turbine generator plant is an apparatus that converts wind energy into electrical energy. Various failures will occur during the entire life cycle of the wind turbine generator plant. In order to eliminate and maintain the failures, the wind turbine generator plant needs to be maintained. During the maintenance, the wind turbine generator plant is shut down, and a maintenance person enters the wind turbine generator plant for maintenance. However, a specific load is still on the wind turbine generator plant in this process. If the load is too large, it will affect the personal safety of the maintenance person and create a safety risk.

SUMMARY

Embodiments of this application provide a method, device, and apparatus for maintaining a wind turbine generator plant, which can reduce the safety risk of the maintenance person or device to enter the wind turbine generator plant.

In a first aspect, the embodiments of this application provide a method for maintaining a wind turbine generator plant, comprising steps of: determining a failure of the wind turbine generator plant when the wind turbine generator plant enters a shutdown maintenance mode; determining a maintenance wind speed corresponding to the failure, and adjusting one of blades in the wind turbine generator plant to reach a predetermined azimuth angle and locking an impeller of the wind turbine generator plant to maintain the wind turbine generator plant in a case where the failure belongs to a first type of failure and a real-time wind speed obtained is less than or equal to the maintenance wind speed corresponding to the failure, the first type of failure comprising a failure that requires to lock the impeller for maintenance and the predetermined azimuth angle comprising a different integral multiple of 30°.

In a second aspect, the embodiments of this application provide a maintenance device for a wind turbine generator plant, comprising: a failure determination module, configured to determine a failure of the wind turbine generator plant when the wind turbine generator plant enters a shutdown maintenance mode; a maintenance wind speed determination module, configured to determine a maintenance wind speed corresponding to the failure; a processing module, configured to adjust one of blades of the wind turbine generator plant to reach a predetermined azimuth angle and lock an impeller of the wind turbine generator plant to maintain the wind turbine generator plant in a case where the failure belongs to a first type of failure and a real-time wind speed obtained is less than or equal to the maintenance wind speed corresponding to the failure, the first type of failure comprising a failure that requires to lock the impeller for maintenance and the predetermined azimuth angle being a different multiple of 30°.

In a third aspect, the embodiments of this application provide a maintenance apparatus for a wind turbine generator plant, comprising a processor and a memory storing computer program instructions thereon, wherein the processor is configured to implement the method for maintaining the wind turbine generator plant in the first aspect when executing the computer program instructions.

The embodiments of this application provide a method, device, and apparatus for maintaining a wind turbine generator plant. When the wind turbine generator plant enters a shutdown maintenance mode, a failure and a maintenance wind speed corresponding to the failure are determined. In a case where the failure is a failure that requires to lock the impeller of the wind turbine generator plant for maintenance and a real-time wind speed is less than the corresponding maintenance wind speed, one blade of the wind turbine generator plant is adjusted to reach a predetermined azimuth angle that enables a small load on the wind turbine generator plant, and the impeller is locked so that a maintenance person or device enters the wind turbine generator plant to maintaining the wind turbine generator plant. If the azimuth angles of the blades of the wind turbine generator plant are different, the load on the wind turbine generator plant is also different. The larger the load, the more dangerous it is for the maintenance person or device to enter the wind turbine generator plant later.

Locking the impeller when one blade reaches a predetermined azimuth angle including a different integral multiple of 300 can reduce the load on the wind turbine generator plant and the safety risk of the maintenance person or device to enter the wind turbine generator plant.

BRIEF DESCRIPTION OF THE DRAWINGS

In order to explain the technical solutions of the embodiments of this application more clearly, the drawings required to be used in the embodiments of this application will be briefly introduced below. For those skilled in the art, additional drawings can be obtained based on these drawings without creative efforts.

DETAILED DESCRIPTION

Features and exemplary embodiments of various aspects of this application will be described in detail below. In order to make the purpose, technical solutions and advantages of this application clearer, this application will be described in further detail below with reference to the accompanying drawings and specific embodiments. It should be understood that the specific embodiments described here are only intended to explain but not to limit this application. It will be apparent to those skilled in the art that this application may be practiced without some of these specific details. The following description of embodiments is merely intended to provide a better understanding of this application by illustrating examples thereof.

A wind turbine generator plant is an apparatus that converts wind energy into electrical energy. Various failures will occur during the entire life cycle of the wind turbine generator plant. In order to eliminate and maintain the failures, the wind turbine generator plant needs to be maintained. During the maintenance, the wind turbine generator plant is shut down, and the maintenance person enters the wind turbine generator plant for maintenance. However, a specific load is still on the wind turbine generator plant in this process. If the load is too large, it will affect the personal safety of the maintenance person and create safety risk.

This application provides a method, device, and apparatus for maintaining a wind turbine generator plant. When the wind turbine generator plant needs maintenance, the wind turbine generator plant can be controlled to enter the shutdown maintenance mode, and a failure and a maintenance wind speed corresponding to the failure are determined. In a case where the failure is a failure that requires to lock an impeller of the wind turbine generator plant for maintenance and a real-time wind speed is less than the corresponding maintenance wind speed, one blade of the wind turbine generator plant is adjusted to reach a predetermined azimuth angle that enables a small load on the wind turbine generator plant, and the impeller is locked for maintenance of the wind turbine generator plant. Locking the impeller when one blade reaches a predetermined azimuth angle can reduce the load on the wind turbine generator plant and the safety risk during maintenance.

The method, device, and apparatus for maintaining the wind turbine generator plant provided by this application will be described in sequence below.

Figure 1:
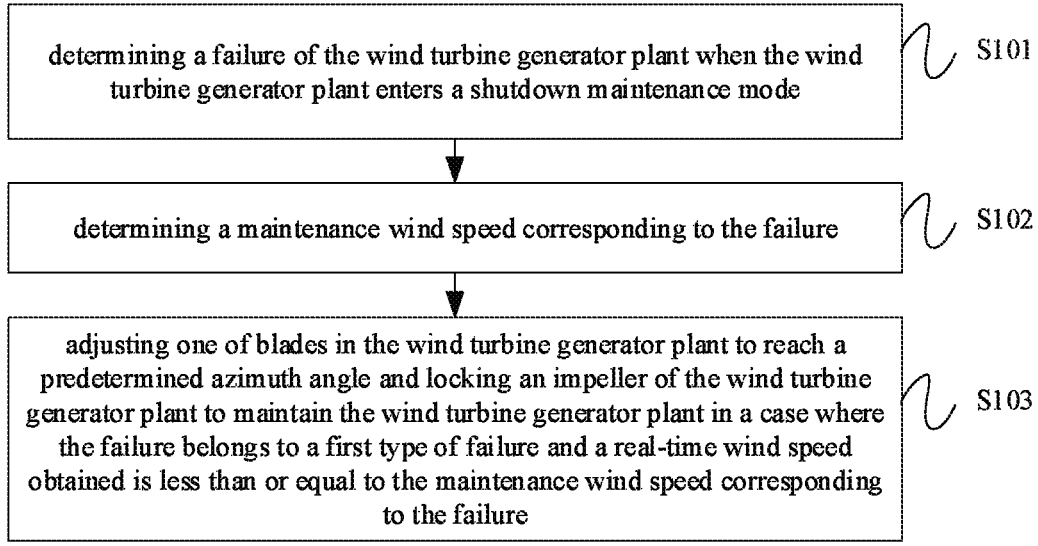
FIG. 1 is a flow chart of a method for maintaining a wind turbine generator plant provided by an embodiment of this application.

FIG. 1 shows a method for maintaining a wind turbine generator plant according to an embodiment of this application. As shown in FIG. 1, the method for maintaining the wind turbine generator plant may include steps S101 to S103.

In step S101, a failure of the wind turbine generator plant is determined when a wind turbine generator plant enters a shutdown maintenance mode.

When the wind turbine generator plant fails, the maintenance of the wind turbine generator plant requires controlling the wind turbine generator plant to enter a shutdown maintenance mode. In the shutdown maintenance mode, the wind turbine generator plant is shut down to wait for maintenance. When the wind turbine generator plant enters the shutdown maintenance mode, it is possible to determine what failure is occurred in the wind turbine generator plant. For example, possible failures in the wind turbine generator plant may include a pitch stuck failure, transmission chain failure, yaw failure, and the like, which are not limited here. The pitch stuck failure is a failure in which a blade of the wind turbine generator plant gets pitch stuck. The pitch stuck refers to a situation where a blade of the wind turbine generator plant should be retracted to a fully feathering angle, but the pitch angle is not a fully feathering angle. The transmission chain failure refers to a failure in which the transmission chain of the wind turbine generator plant fails. The transmission chain may include a component, such as a transmission shaft, gearbox, and generator, in the wind turbine generator plant. The failure of these transmission-related components can be regarded as the transmission chain failure. The yaw failure may include a yaw start-up failure, a yaw pressure failure, a yaw signal line loose, a yaw power cable loose, and other yaw-related failures, which are not limited here.

In step S102, a maintenance wind speed corresponding to the failure is determined.

The maintenance wind speed is the maximum safe wind speed at which a maintenance person or device can enter the wind turbine generator plant for maintenance. There is a correspondence between the failure and the maintenance wind speed, and different failures may correspond to different maintenance wind speeds. After the failure is determined, the maintenance wind speed corresponding to the failure is determined based on the correspondence between the failure and the maintenance wind speed.

In step S103, in a case where the failure belongs to a first type of failure and a real-time wind speed obtained is less than or equal to the maintenance wind speed corresponding to the failure, one blade of the wind turbine generator plant is adjusted to reach a predetermined azimuth angle, and an impeller of the wind turbine generator plant is locked for maintenance of the wind turbine generator plant.

The first type of failure includes a failure that requires to lock the impeller for maintenance. To maintain the first type of failure, the maintenance person or device needs to enter the impeller. In order to protect the safety of the maintenance person or device, the impeller needs to be locked to prevent the impeller from acting, thereby avoiding danger to the maintenance person or device. The real-time wind speed is a wind speed obtained in real-time. If the real-time wind speed is less than or equal to the maintenance wind speed corresponding to the failure, it means that the current wind has a small impact on the wind turbine generator plant and will not bring danger to the maintenance person or device.

After the impeller of the wind turbine generator plant is locked, if the azimuth angle of the blade of the wind turbine generator plant is different, the load on the wind turbine generator plant is also different. The larger the load, the more dangerous it is for the maintenance person or device to enter the wind turbine generator plant later. In an embodiment of this application, the predetermined azimuth angle includes a different integral multiple of 30°. One blade in the wind turbine generator plant can be adjusted to reach the predetermined azimuth angle to reduce the load on the wind turbine generator plant, thus reducing a safety risk of the maintenance person or device to enter the wind turbine generator plant. In some examples, the predetermined azimuth angle may include 1800 or 270°.

In some embodiments, the first type of failure includes a pitch stuck failure and a transmission chain failure. A maintenance wind speed corresponding to the pitch stuck failure is less than a maintenance wind speed corresponding to the transmission chain failure. In the case of the pitch stuck failure, the pitch angle of the pitch stuck blade is not a fully feathering angle, resulting in a large load due to the pitch stuck failure. The transmission chain failure will not bring as much load to the wind turbine generator plant as the pitch stuck failure. That is, the load brought by the transmission chain failure to the wind turbine generator plant is less than the load brought by the pitch stuck failure to the wind turbine generator plant. The loads on the wind turbine generator plant include the load caused by the failure and the load caused by the real-time wind condition. The larger the wind speed is, the larger the load is. In a case where the maximum load to ensure the safety of the maintenance person or device to enter the wind turbine generator plant is certain, the load caused by the failure is less, the load range left for the maintenance wind speed will be larger, that is, the maintenance wind speed can be appropriately increased. The load caused by the transmission chain failure is less than the load caused by the pitch stuck failure. Correspondingly, the maintenance wind speed corresponding to the pitch stuck failure is less than the maintenance wind speed corresponding to the transmission chain failure. The difference between the maintenance wind speed corresponding to the transmission chain failure and the maintenance wind speed corresponding to the pitch stuck failure can be set according to specific scenarios, needs, experience, and the like, which is not limited here. For example, the maintenance wind speed corresponding to the pitch stuck failure is V1, the maintenance wind speed corresponding to the transmission chain failure is V2, and V1+ΔV1=V2. The value of ΔV1 is not limited here. For example, ΔV1=3 meters/second. Setting different maintenance wind speeds for different failures improves the flexibility in setting the maintenance wind speed and also prolongs a window period of the maintenance wind speed during the maintenance of the wind turbine generator plant.

In this embodiment of this application, when the wind turbine generator plant enters the shutdown maintenance mode, the failure and the maintenance wind speed corresponding to the failure are determined. In a case where the failure is a failure that requires to lock the impeller of the wind turbine generator plant for maintenance and the real-time wind speed is less than the corresponding maintenance wind speed, one blade of the wind turbine generator plant is adjusted to reach a predetermined azimuth angle at which the load on the wind turbine generator plant is small, and the impeller is locked. Thus, the maintenance person or device enters the wind turbine generator plant to maintain the wind turbine generator plant. If the azimuth angle of the blade of the wind turbine generator plant is different, the load on the wind turbine generator plant is also different. The larger the load, the more dangerous it is for the maintenance person or device to enter the wind turbine generator plant later. Locking the impeller when one blade reaches a predetermined azimuth angle including a different integral multiple of 300 can reduce the load on the wind turbine generator plant and the safety risk of the maintenance person or device to enter the wind turbine generator plant.

Figure 2:
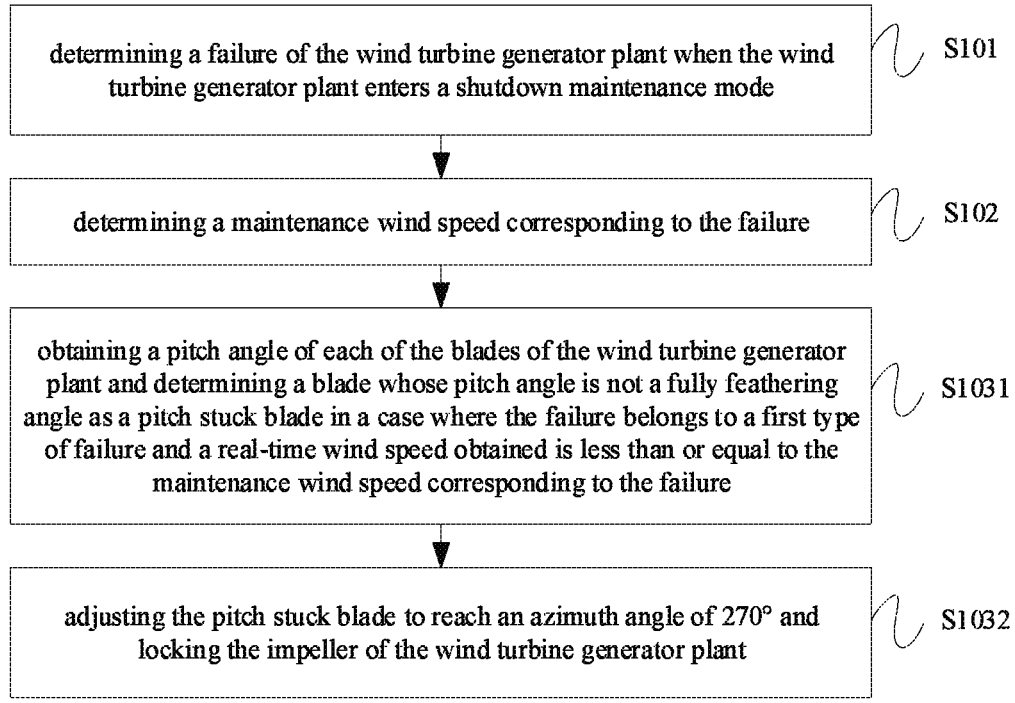
FIG. 2 is a flow chart of a method for maintaining a wind turbine generator plant provided by another embodiment of this application.

In some embodiments, the failure includes a pitch stuck failure. FIG. 2 shows a method for maintaining a wind turbine generator plant according to another embodiment of this application. The difference between FIG. 2 and FIG. 1 is that step S103 in FIG. 1 can be specifically refined as step S1031 and step S1032 in FIG. 2.

In step S1031, in a case where the failure belongs to a first type of failure and a real-time wind speed obtained is less than or equal to the maintenance wind speed corresponding to the failure, a pitch angle of each of the blades of the wind turbine generator plant is obtained, and a blade whose pitch angle is not fully feathered is determined as a pitch stuck blade.

In a case where the failure includes a pitch stuck failure, a pitch stuck blade needs to be determined. The pitch angle of each of the blades can be obtained, and a blade that does not reach a fully feathering angle is determined as the pitch stuck blade. The fully feathering angle is a pitch angle that the blade should have in a shutdown maintenance model of the wind turbine generator plant. It may include an angle range or an angle value and is set according to specific scenarios, needs, experience, and the like, which is not limited here. For example, the fully feathering angle may include 90°, 93°, 95°, or the like.

In step S1032, the pitch stuck blade is adjusted to reach an azimuth angle of 270°, and the impeller of the wind turbine generator plant is locked.

Figure 3:
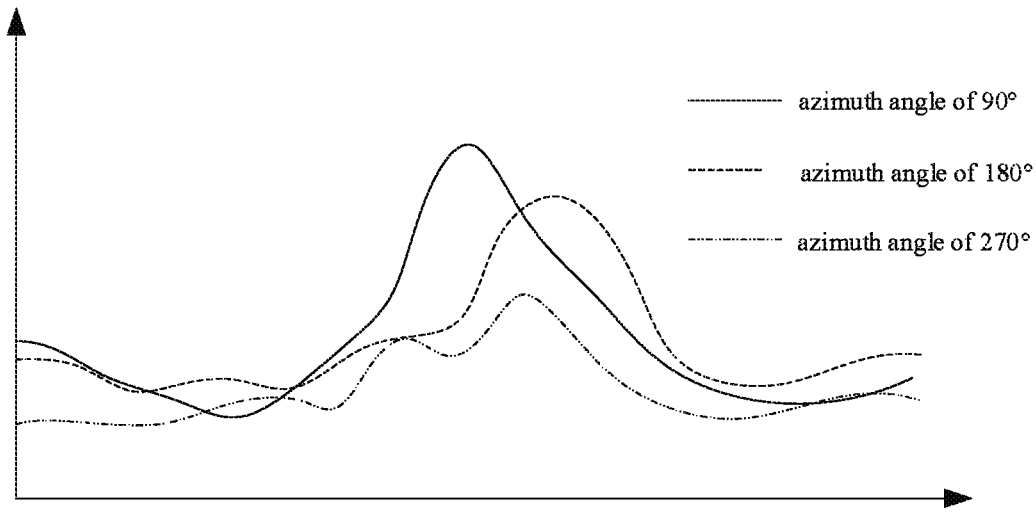
FIG. 3 is a schematic diagram of a load on a wind turbine generator plant when a blade is locked at azimuth angles of 90°, 1800 and 270° in an embodiment of this application.

When the pitch stuck failure occurs in the wind turbine generator plant, the blade position is unbalanced, which brings a large load to the wind turbine generator plant. In order to minimize the load on the wind turbine generator plant, the locking position of the impeller of the wind turbine generator plant may be set; that is, the pitch stuck blade is adjusted to reach the azimuth angle of 270° at which the impeller is locked. Locating the pitch stuck blade at the azimuth angle of 270° may minimize the load on the wind turbine generator plant after the impeller is locked. For example, FIG. 3 shows the loads on the wind turbine generator plant when the blades are locked at azimuth angles of 90°, 180°, and 270° in the embodiments of this application, in which the ordinate indicates the loads on the wind turbine generator plant caused by locking the blade at the azimuth angles. As shown in FIG. 3, the blade locked at the azimuth angle of 270° brings the smallest load to the wind turbine generator plant. In a case where the pitch stuck blade brings a large load to the wind turbine generator plant, in order to reduce the total load on the wind turbine generator plant, the predetermined azimuth angle can be set to 270° to minimize the load on the wind turbine generator plant caused by locking the impeller.

In a case where the failure includes a pitch stuck failure, the maintenance of the wind turbine generator plant may specifically include the maintenance of the pitch stuck blade.

Figure 4:
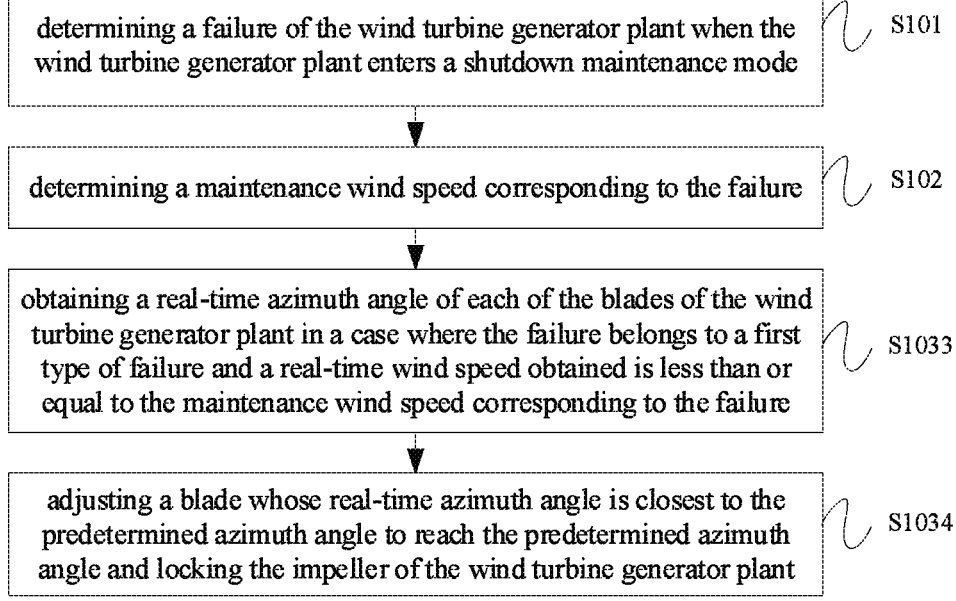
FIG. 4 is a flow chart of a method for maintaining a wind turbine generator plant provided by yet another embodiment of this application.

In some embodiments, the failure includes a transmission chain failure. FIG. 4 shows a flow chart of a method for maintaining a wind turbine generator plant according to another embodiment of this application. The difference between FIG. 4 and FIG. 1 is that step S103 in FIG. 1 can be specifically refined as step S1033 and step S1034 in FIG. 4.

In step S1033, if the failure belongs to a first type of failure and a real-time wind speed obtained is less than or equal to the maintenance wind speed corresponding to the failure, a real-time azimuth angle of each of the blades of the wind turbine generator plant is obtained.

When the wind turbine generator plant enters the shutdown maintenance state, the azimuth angles of the blades may change due to factors such as wind and inertia. In order to facilitate the adjustment of the blades to reach the predetermined azimuth angles, the real-time azimuth angle of each of the blades may be obtained first. The real-time azimuth angles are azimuth angles which are in real time.

In step S1034, the blade whose real-time azimuth angle is closest to the predetermined azimuth angle is adjusted to reach the predetermined azimuth angle, and the impeller of the wind turbine generator plant is locked.

Compared with the pitch stuck failure, the transmission chain failure may bring a small load to the wind turbine generator plant. It is unnecessary to select the predetermined azimuth angle that brings the minimum load to the wind turbine generator plant. Therefore, compared to the pitch stuck failure, more predetermined azimuth angles may be selected. In order to quickly adjust the blades to be in the appropriate position, a blade whose real-time azimuth angle is close to the predetermined azimuth angle can reach the predetermined azimuth angle. For example, the predetermined azimuth angle includes 1800 and 270°, and if the real-time azimuth angle of one blade among a plurality of blades of the wind turbine generator plant is 170°, the blade is adjusted to reach the azimuth angle of 180° and the impeller is locked.

In a case where the failure includes a transmission chain failure, the maintenance of the wind turbine generator plant may specifically include maintenance of the transmission chain.

Figure 5:
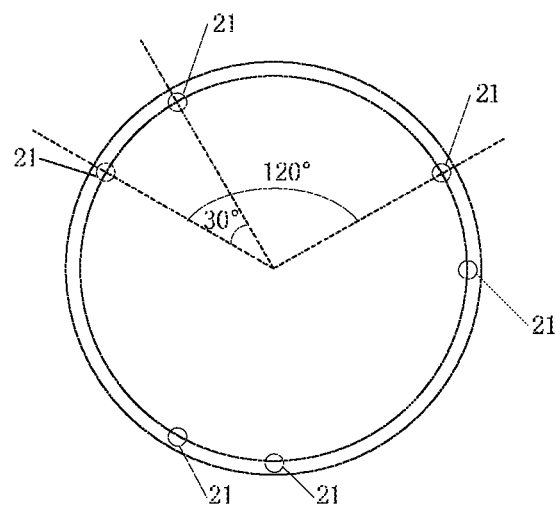
FIG. 5 is a schematic diagram of an example of a locking hole on a locking disk according to an embodiment of this application.

In some embodiments, in order to enable the blades to reach the predetermined azimuth angle and to simplify a structure of the wind turbine generator plant related to the lock of the blade as much as possible, three sets of locking holes may be provided on a locking disk of a main shaft of the wind turbine generator plant. FIG. 5 shows positions of the locking holes on the locking disk according to an embodiment of this application. As shown in FIG. 5, each set of locking holes 21 includes two locking holes 21, and an angle of 30° is formed between the two locking holes. An angle of 120° is formed between first locking holes 21 of any two sets of locking holes 21. The position of the first locking hole 21 in each set of locking holes 21 is consistent with or at a
   specific angle with respect to the position of the blade.
      The specific angle can be set according to specific scenarios, needs, and the like, which is not limited here. Correspondingly, in order to lock the impeller by using the locking hole 21, the wind turbine generator plant further includes a locking pin. One locking pin is located at an azimuth angle of 60° or at a specific angle with respect to the azimuth angle of 60°, and the other locking pin is located at an azimuth angle of 300° or at a specific angle with respect to the azimuth angle of 300°. There are more than two locking pins, which is not limited here. When the position of the first locking hole 21 in each set of locking holes 21 is consistent with the position of the blade, one locking pin is located at an azimuth angle of 60°, and the other locking pin is located at an azimuth angle of 300°. In a case where the position of the first locking hole 21 in each set of locking holes 21 is at a specific angle with respect to the position of the blade, one locking pin is at a specific angle with respect to the azimuth angle of 60°, and the other locking pin is at a specific angle with respect to the azimuth angle of 300°.

Figure 6:
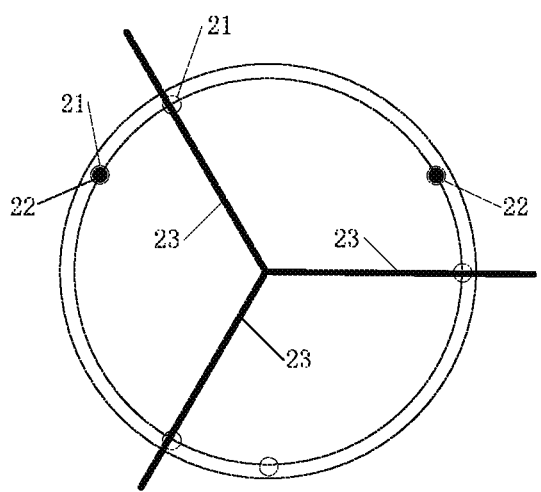
FIG. 6 is a schematic diagram of an example of a locking hole and a locking pin when a blade reaches an azimuth angle of 90° provided by an embodiment of this application.
Figure 7:
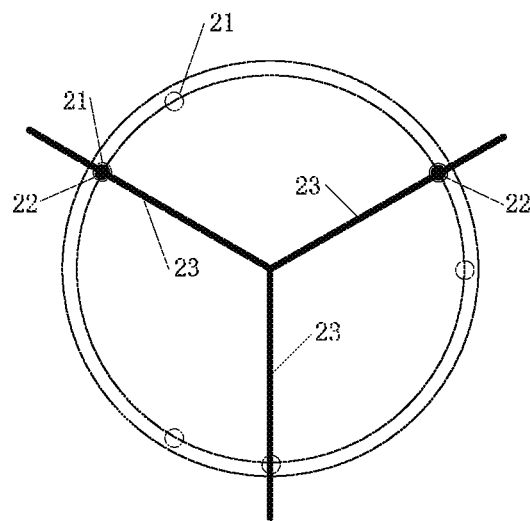
FIG. 7 is a schematic diagram of an example of a locking hole and a locking pin when a blade reaches an azimuth angle of 180° provided by an embodiment of this application.
Figure 8:
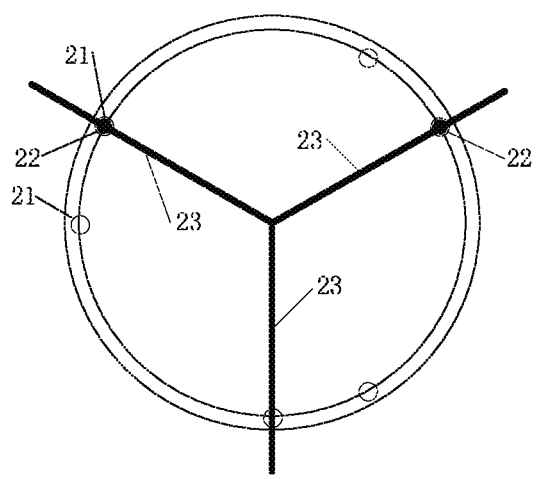
FIG. 8 is a schematic diagram of another example of a locking hole and a locking pin when a blade reaches an azimuth angle of 180° provided by an embodiment of this application.
Figure 9:
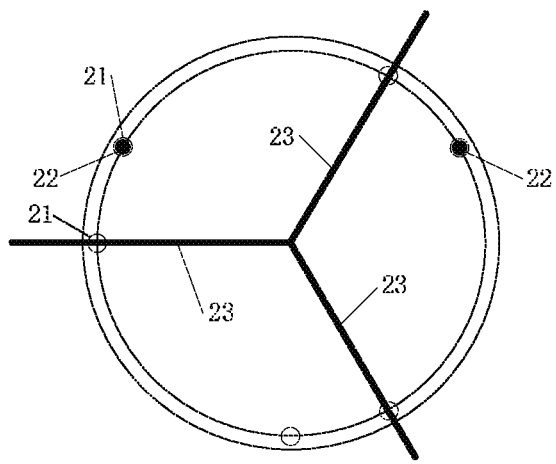
FIG. 9 is a schematic diagram of an example of a locking hole and a locking pin when one blade reaches an azimuth angle of 270° provided by the embodiment of this application.

For the convenience of explanation, the description is made by taking a case, where the position of the first locking hole 21 in each set of locking holes 21 is consistent with the position of the blade, as an example. FIG. 6 shows the positional relationship between the locking hole and the locking pin when one blade reaches an azimuth angle of 90° according to an embodiment of this application. As shown in FIG. 6, one locking pin 22 is located at an azimuth angle of 60°, the other locking pin 22 is located at an azimuth angle of 300°, and the three blades 23 of the wind turbine generator plant are located at azimuth angles of 90°, 210°, and 330°, respectively. FIG. 7 shows a positional relationship between the locking hole and the locking pin when one blade reaches an azimuth angle of 180° according to an embodiment of this application. FIG. 8 shows another positional relationship between the locking hole and the locking pin when one blade reaches an azimuth angle of 180° according to an embodiment of this application. As shown in FIGS. 7 and 8, one locking pin 22 is located at an azimuth angle of 60°, the other locking pin 22 is located at an azimuth angle of 300°, and the three blades 23 of the wind turbine generator plant are located at azimuth angles of 60°, 180°, and 300°, respectively. FIG. 9 shows the positional relationship between the locking holes and the locking pins when one blade reaches an azimuth angle of 270° according to an embodiment of this application. As shown in FIG. 9, one locking pin 22 is located at an azimuth angle of 60°, the other locking pin 22 is located at an azimuth angle of 300°, and the three blades 23 of the wind turbine generator plant are located at azimuth angles of 30°, 150°, and 270°, respectively. In a case where the locking holes and locking pins of the wind turbine generator plant are provided as the above embodiment, the above step S103 can be specifically refined as below. When one locking hole of one set of locking holes is aligned with the locking pin at an azimuth angle of 60°, and one locking hole in the other set of locking holes is aligned with the locking pin located at an azimuth angle of 300°, the locking pins are controlled to be inserted into the locking holes to lock the impeller. The details of which locking hole is aligned with the locking pin can be seen in FIGS. 6, 7, 8, and 9 and the related description in the embodiments described above, which will not be described again here.

The method for maintaining the wind turbine generator plant provided by the embodiments of this application can also be applied to other designs of locking holes and locking pins that enable the blade to reach a predetermined azimuth angle, which is not limited here.

In the above embodiment, one blade of the wind turbine generator plant may be adjusted to reach a predetermined azimuth angle manually or automatically by the wind turbine generator plant. In some embodiments, the transmission component in the wind turbine generator plant is driven by using a control signal to drive one blade of the wind turbine generator plant to reach a predetermined azimuth angle. The wind turbine generator plant enters the shutdown maintenance mode and is shut down. At this time, the transmission components in the wind turbine generator plant can be driven by external input control signals. Hence, the transmission components can drive the blade to rotate to reach a predetermined azimuth angle.

Figure 10:
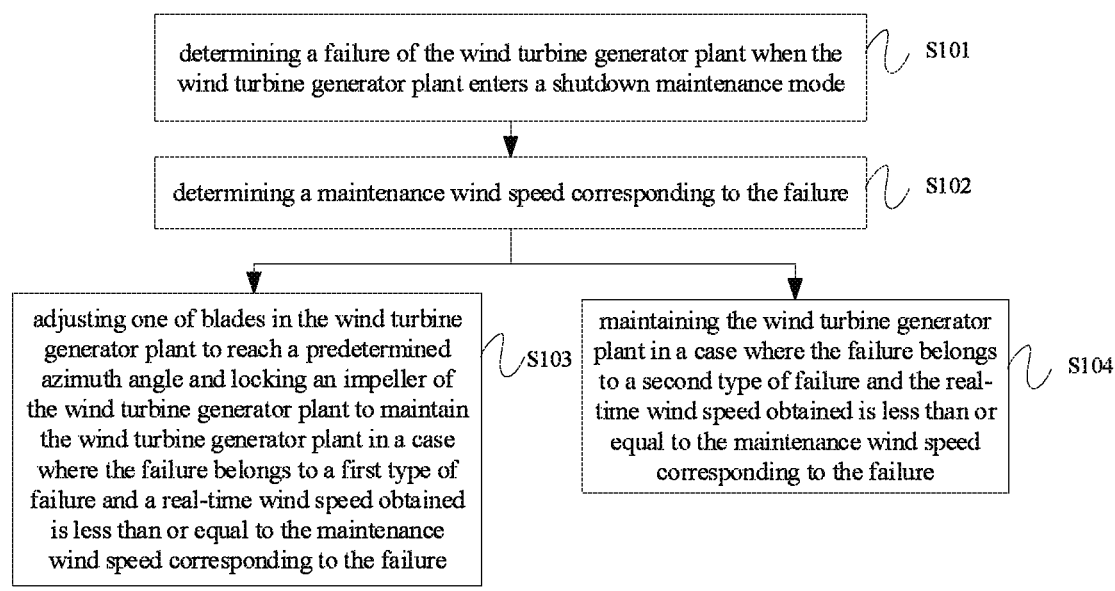
FIG. 10 is a flow chart of a method for maintaining a wind turbine generator plant provided by yet another embodiment of this application.

In some embodiments, the failure of the wind turbine generator plant may also include a failure that requires to lock the impeller for maintenance. FIG. shows a method for maintaining a wind turbine generator plant according to yet another embodiment of this application. The difference between FIG. 10 and FIG. 1 is that the method for maintaining the wind turbine generator plant shown in FIG. 10 may further include step S104.

In step S104, if the failure belongs to a second type of failure and a real-time wind speed obtained is less than or equal to the maintenance wind speed corresponding to the failure, the wind turbine generator plant is maintained.

The second type of failure includes a failure whose maintenance process does not require to lock the impeller. The second type of failure includes a failure that does not require the maintenance person or device to enter the impeller. For example, the second type of failure may include a yaw failure. The failure belongs to the second type of failure, and the real-time wind speed is less than or equal to the maintenance wind speed corresponding to the failure, which means that it is safe to maintain the second type of failure at this time and the maintenance person or device can enter the wind turbine generator plant for maintenance.

In a case where the failure includes a yaw failure, the maintenance of the wind turbine generator plant may specifically include the maintenance of the yaw system or individual components in the yaw system.

In some examples, the first type of failure includes a pitch stuck failure, the second type of failure includes a yaw failure, and a maintenance wind speed corresponding to the yaw failure is larger than a maintenance wind speed corresponding to the pitch stuck failure. The pitch stuck failure will bring a large load to the wind turbine generator plant. The yaw failure does not bring as much load to the wind turbine generator plant as the pitch stuck failure. That is, the load brought by the yaw failure to the wind turbine generator plant is less than the load on the wind turbine generator plant by the pitch stuck failure. For example, under the same conditions, through measurement, the load on the wind turbine generator plant under the second type of failure is 26% less than the load on the wind turbine generator plant under the pitch stuck failure condition. The load on the wind turbine generator plant includes the load caused by the failure and the load caused by real-time wind conditions. The larger the wind speed, the larger the load. In a case where the maximum load to ensure the safety of the maintenance person or device to enter the wind turbine generator plant is certain, the load caused by the failure is less, the load range left for the maintenance wind speed will be larger; that is, the maintenance wind speed can be appropriately increased. The load caused by the yaw failure is less than the load caused by the pitch stuck failure. Correspondingly, the maintenance wind speed corresponding to the pitch stuck failure is less than the maintenance wind speed corresponding to the yaw failure. The difference between the maintenance wind speed corresponding to the yaw failure and the maintenance wind speed corresponding to the pitch stuck failure may be set according to specific scenarios, needs, experience, and the like, which is not limited here. For example, the maintenance wind speed corresponding to the pitch stuck failure is V1, the maintenance wind speed corresponding to the yaw failure is V3, and V1+ΔV2=V3. The value of ΔV2 is not limited here. For example, ΔV2=3 meters/second. Setting different maintenance wind speeds for different failures improves the flexibility in setting the maintenance wind speed and also prolongs a window period of the maintenance wind speed during the maintenance of the wind turbine generator plant.

Figure 11:
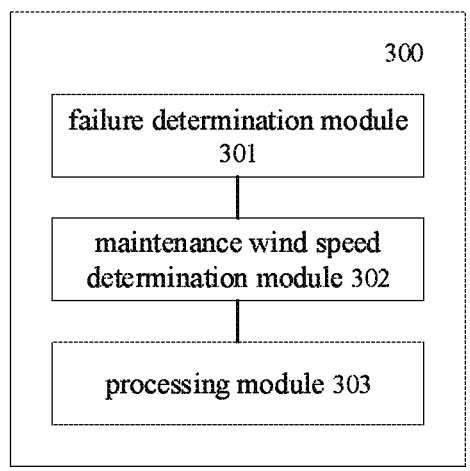
FIG. 11 is a schematic structural diagram of a maintenance device for a wind turbine generator plant provided by an embodiment of this application.

This application also provides a maintenance device for a wind turbine generator plant. FIG. 11 shows a maintenance device for a wind turbine generator plant according to an embodiment of this application. As shown in FIG. 11, the maintenance device 300 of the wind turbine generator plant may include a failure determination module 301, a maintenance wind speed determination module 302, and a processing module 303.

The failure determination module 301 may be configured to determine a failure of the wind turbine generator plant when the wind turbine generator plant enters a shutdown maintenance mode.

The maintenance wind speed determination module 302 may be configured to determine the maintenance wind speed corresponding to the failure.

The processing module 303 can be configured to adjust one blade of the wind turbine generator plant to reach a predetermined azimuth angle and lock an impeller of the wind turbine generator plant for maintenance of wind turbine generator plant in a case where the failure belongs to a first type of failure and a real-time wind speed obtained is less than or equal to the maintenance wind speed corresponding to the failure.

The first type of failure includes a failure that requires to lock the impeller for maintenance. The predetermined azimuth angle is a different multiple of 30°.

In some examples, the predetermined azimuth angle includes 180° or 270°.

In this embodiment of this application, when the wind turbine generator plant enters the shutdown maintenance mode, the failure and the maintenance wind speed corresponding to the failure are determined. In a case where the failure is a failure that requires to lock the impeller of the wind turbine generator plant for maintenance and a real-time wind speed obtained is less than the corresponding maintenance wind speed, one blade of the wind turbine generator plant is adjusted to reach a predetermined azimuth angle that enables a small load on the wind turbine generator plant and the impeller is locked. Hence, the maintenance person or device enters the wind turbine generator plant for maintenance of the wind turbine generator plant. If the azimuth angle of the blade of the wind turbine generator plant is different, the load on the wind turbine generator plant is different. The larger the load, the more dangerous it is for the maintenance person or device to enter the wind turbine generator plant later. Locking the impeller when one blade reaches a predetermined azimuth angle including a different integral multiple of 300 can reduce the load on the wind turbine generator plant and the safety risk of the maintenance person or device to enter the wind turbine generator plant.

In some embodiments, the failure includes a pitch stuck failure.

The processing module 303 can be configured to obtain a pitch angle of each of blades of the wind turbine generator plant and determine a blade whose pitch angle is not a fully feathering angle as a pitch stuck blade; adjust the pitch stuck blade to reach an azimuth angle of 270° and lock an impeller of the wind turbine generator plant.

In some embodiments, the failure includes a transmission chain failure.

The processing module 303 can be configured to obtain a real-time azimuth angle of each of blades of the wind turbine generator plant; adjust a blade whose real-time azimuth angle is closest to the predetermined azimuth angle to reach the predetermined azimuth angle and lock an impeller of the wind turbine generator plant.

In some embodiments, the first type of failure includes a pitch stuck failure and a transmission chain failure. A maintenance wind speed corresponding to the pitch stuck failure is less than a maintenance wind speed corresponding to the transmission chain failure.

In some embodiments, a locking disk of a main shaft of the wind turbine generator plant has three sets of locking holes. Each set of locking holes includes two locking holes. An angle of 30° is formed between the two locking holes, an angle of 120° is formed between first locking holes in any two sets of locking holes, and the position of the first locking hole in each set of locking holes is consistent with or at a specific angle with respect to the position of the blade.

The wind turbine generator plant has locking pins, one of the locking pin is located at an azimuth angle of 60° or at a specific angle with respect to the azimuth angle of 60°, and the other locking pin is located at an azimuth angle of 300° or at a specific angle with respect to the azimuth angle of 300°.

In some embodiments, the processing module 303 may be configured to control the locking pin to insert into the locking hole to lock the impeller, in a case where one locking hole of one set of locking holes is aligned with the locking pin located at the azimuth angle of 60° and one locking hole in another set of locking holes is aligned with the locking pin located at an azimuth angle of 300°.

In some embodiments, the processing module 303 may also be configured to maintain the wind turbine generator plant in a case where the failure belongs to a second type of failure and a real-time wind speed obtained is less than or equal to the maintenance wind speed corresponding to the failure.

The second type of failure includes a failure that requires to lock the impeller for maintenance.

In some embodiments, the first type of failure includes a pitch stuck failure, the second type of failure includes a yaw failure, and a maintenance wind speed corresponding to the yaw failure is larger than a maintenance wind speed corresponding to the pitch stuck failure.

In some embodiments, the processing module 303 may be configured to drive, by using a control signal, a transmission component of the wind turbine generator plant to drive one blade of the wind turbine generator plant to reach a predetermined azimuth angle.

Figure 12:
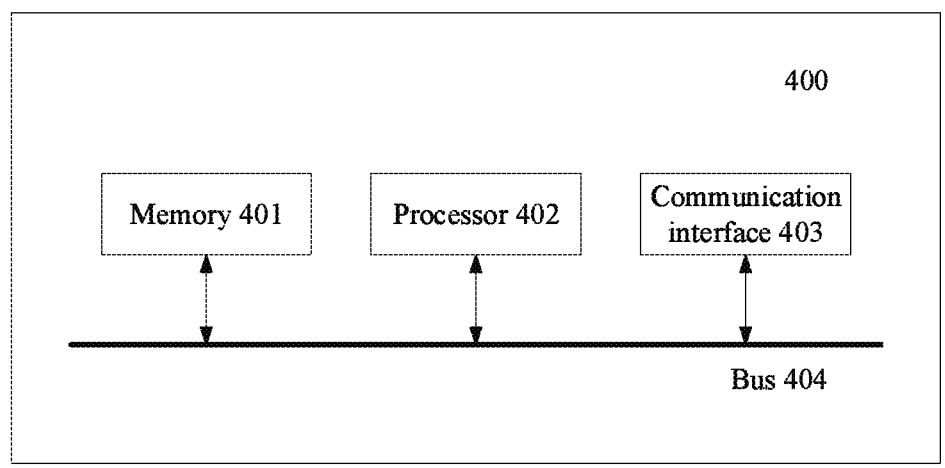
FIG. 12 is a schematic structural diagram of a maintenance apparatus for a wind turbine generator plant provided by an embodiment of this application.

This application also provides a maintenance apparatus for a wind turbine generator plant. FIG. 12 is a schematic structural diagram of a maintenance apparatus for a wind turbine generator plant provided by an embodiment of this application. As shown in FIG. 12, the maintenance apparatus 400 of the wind turbine generator plant includes a memory 401, a processor 402, and a computer program stored in the memory 401 and executable on the processor 402.

In one example, the above processor 402 can include a central processing unit (CPU), or an application-specific integrated circuit (Application Specific Integrated Circuit, ASIC), or one or more integrated circuits that can be configured to implement the embodiments of this application.

The memory 401 can include a read-only memory (Read-Only Memory, ROM), a random access memory (Random Access Memory, RAM), a magnetic disk storage media apparatus, an optical storage media device, a flash memory device, an electrical, optical, or other physical/tangible memory storage device. Thus, typically, the memory can include one or more tangible (non-transitory) computer-readable storage media (such as memory devices) encoded with software including computer-executable instructions, and when the software is executed (such as by one or more processors), the software is operable to perform operations described with reference to the method for maintaining the wind turbine generator plant according to the embodiments of this application.

The processor 402 can run a computer program corresponding to executable program codes stored in the memory 401 by reading the executable program codes so as to implement the method for maintaining the wind turbine generator plant in the above embodiment.

In one example, the maintenance apparatus 400 of the wind turbine generator plant can further include a communication interface 403 and a bus 404.

As shown in FIG. 12, the memory 401, the processor 402, and the communication interface 403 are connected through the bus 404 and communicate with each other.

The communication interface 403 can be configured mainly to implement communications between modules, devices, units, and/or devices in the embodiments of this application. An input apparatus and/or an output apparatus can also be connected through the communication interface 403.

The bus 404 can include hardware, software, or both, and couple components of the maintenance apparatus 400 of the wind turbine generator plant to each other. As an example, rather than limitation, the bus 404 can include an accelerated graphics port (Accelerated Graphics Port, AGP) or other graphics bus, an enhanced industry standard architecture (Enhanced Industry Standard Architecture, EISA) bus, a front side bus (Front Side Bus, FSB), a hypertransport (HyperTransport, HT) interconnect, an industrial standard architecture (Industrial Standard Architecture, ISA) bus, a wireless band interconnect, a low pin count (Low pin count, LPC) bus, a memory bus, a microchannel architecture (MicroChannel Architecture, MCA) bus, a peripheral component interconnect (Peripheral Component Interconnect, PCI) bus, a PCI-Express (PCI-E) bus, a serial advanced technology attachment (Serial Advanced Technology Attachment, SATA) bus, a video electronics standards association local bus (Video Electronics Standards Association Local Bus, VLB) bus, or other suitable bus or a combination of two or more of these. When appropriate, the bus 404 can include one or more buses. Although the embodiment of this application describes and illustrates a particular bus, any suitable bus or interconnect should be considered in this application.

This application also provides a computer-readable storage medium, having computer program instructions stored thereon. The computer program instructions, when executed by a processor, can implement the methods for maintaining the wind turbine generator plant in the above embodiments, which can achieve the same technological effects and will not be repeated here to avoid redundancy. The above computer-readable storage medium can include a non-transitory computer-readable storage medium, such as a read-only memory (Read-Only Memory, ROM), a random access memory (Random Access Memory, RAM), a magnetic disk or an optical disk etc., which is not limited herein.

This application also provides a computer program product. When the instructions in the computer program product are executed by a processor of an electronic apparatus, the electronic device performs the method for maintaining the wind turbine generator plant in the above embodiment, which can achieve the same technical effect. For the specifics, please refer to the relevant descriptions in the above embodiments. To avoid repetition, they will not be described again here.

It should be noted that, the various embodiments in the specification are described in a progressive way, and the same or similar parts of these embodiments may be referred to each other. Each embodiment focuses on the differences from other embodiments. For the embodiments of the device, the device, the computer-readable storage medium, and the computer program product, related parts can refer to the description part of the method embodiments. The application is not limited to the specific steps and structures described above and shown in the figures. Those skilled in the art can make various changes, modifications and additions, or change the order between steps after understanding the gist of this application. And, for the sake of brevity, a refined description of known methods and technologies is omitted here.

Aspects of this application are described above with reference to flow charts and/or block diagrams of the methods, devices (systems) and computer program products according to the embodiments of this application. It should be understood that each block of the flow charts and/or the block diagrams, and a combination of respective blocks of the flow charts and/or the block diagrams can be implemented by computer program instructions. These computer program instructions can be provided to a processor of a general purpose computer, special purpose computer, or other programmable data processing apparatus, to produce a machine, such that execution of the instructions by the processor of the computer or other programmable data processing device enables the implementation of the functions/actions specified in one or more blocks of the flow charts and/or the block diagrams. Such processor can be but is not limited to a general purpose processor, a special purpose processor, an application specific processor, or a field programmable logic circuit. It should also be understood that each block of the block diagrams and/or the flow charts, and a combination of blocks of the block diagrams and/or the flow charts can also be implemented by special purpose hardware for performing specified functions or actions, or by a combination of the special purpose hardware and a computer instruction.

Those skilled in the art should understand that the above embodiments are all illustrative and not restrictive. Different technical features appearing in different embodiments can be combined to achieve beneficial effects. Those skilled in the art should be able to understand and implement other modified embodiments of the disclosed embodiments, on the basis of studying the drawings, the description, and the claims. In the claims, the term "comprising" does not exclude other devices or steps; the numeral word "one" does not exclude more than one; the terms "first" and "second" are used to indicate names and not to indicate any particular order. Any reference signs in the claims should not be construed as limiting the protection scope. The functions of several parts appearing in the claims can be implemented by a single hardware or software module. The presence of certain technical features in different dependent claims does not mean that these technical features cannot be combined to obtain beneficial effects.

What is claimed is:

1. A method for maintaining a wind turbine generator plant, comprising steps of:
   determining a failure of the wind turbine generator plant when the wind turbine generator plant enters a shutdown maintenance mode;
   determining a maintenance wind speed corresponding to the failure, and
   adjusting one of blades in the wind turbine generator plant to reach a predetermined azimuth angle and locking an impeller of the wind turbine generator plant to maintain the wind turbine generator plant in a case where the failure belongs to a first type of failure and a real-time wind speed obtained is less than or equal to the maintenance wind speed corresponding to the failure, the first type of failure comprising a failure that requires to lock the impeller for maintenance and the predetermined azimuth angle comprising one of integer multiples of 30°.

2. The method according to claim 1, wherein the predetermined azimuth angle comprises 180° or 270°.

3. The method according to claim 1, wherein the failure comprises a pitch stuck failure, and
   the step of adjusting one of blades in the wind turbine generator plant to reach the predetermined azimuth angle and locking the impeller of the wind turbine generator plant comprises
   obtaining a pitch angle of each of the blades of the wind turbine generator plant and determining a blade whose pitch angle is not a fully feathering angle as a pitch stuck blade, and
   adjusting the pitch stuck blade to reach an azimuth angle of 270° and locking the impeller of the wind turbine generator plant.

4. The method according to claim 1, wherein the failure comprises a transmission chain failure, and
   the step of adjusting one of blades in the wind turbine generator plant to reach the predetermined azimuth angle and locking the impeller of the wind turbine generator plant comprises
   obtaining a real-time azimuth angle of each of the blades of the wind turbine generator plant, and
   adjusting a blade whose real-time azimuth angle is closest to the predetermined azimuth angle to reach the predetermined azimuth angle and locking the impeller of the wind turbine generator plant.

5. The method according to claim 1, wherein the first type of failure comprises a pitch stuck failure and a transmission chain failure, and a maintenance wind speed corresponding to the pitch stuck failure is less than a maintenance wind speed corresponding to the transmission chain failure.

6. The method according to claim 1, wherein
   a locking disk of a main shaft of the wind turbine generator plant comprises three sets of locking holes, each set of the locking holes comprises two locking holes, an angle of 30° is formed between the two locking holes, an angle of 120° is formed between first locking holes in any two sets of locking holes, and a position of the first locking hole in each set of locking holes is consistent with or forms a specific angle with respect to a position of the blade;
   the wind turbine generator plant comprises two or more locking pins, one locking pin of the locking pins is located at an azimuth angle of 60° or forms a specific angle with respect to the azimuth angle of 60°, and another locking pin of the locking pins is located at an azimuth angle of 300° or forms a specific angle with respect to the azimuth angle of 300°.

7. The method according to claim 6, wherein the step of adjusting one of blades in the wind turbine generator plant to reach the predetermined azimuth angle and locking the impeller of the wind turbine generator plant comprises controlling, when one locking hole of one set of locking holes of the three sets of locking holes is aligned with the one locking pin located at the azimuth angle of 60° and one locking hole of one set of locking holes of remaining sets of locking holes is aligned with the another locking pin located at the azimuth angle of 300°, insertion of the one locking pin into the one locking hole of the one set of locking holes of the three sets of locking holes and the another locking pin into the one locking bole of the one set of locking holes of the remaining sets of locking holes to lock the impeller.

8. The method according to claim 1, further comprising a step of:
maintaining the wind turbine generator plant in a case where the failure belongs to a second type of failure and the real-time wind speed obtained is less than or equal to the maintenance wind speed corresponding to the failure, the second type of failure comprising a failure whose maintenance process does not require to lock the impeller.

9. The method according to claim 8, wherein the first type of failure comprises a pitch stuck failure, the second type of failure comprises a yaw failure, and a maintenance wind speed corresponding to the yaw failure is larger than a maintenance wind speed corresponding to the pitch stuck failure.

10. The method according to claim 1, wherein the step of adjusting one of blades of the wind turbine generator plant to reach the predetermined azimuth angle comprises
driving a transmission component in the wind turbine generator plant by using a control signal to drive one of the blades in the wind turbine generator plant to reach the predetermined azimuth angle.

11. A non-transitory computer-readable storage medium that stores a computer-executable program for maintaining a wind turbine generator plant, the program comprising instructions for:
determining a failure of the wind turbine generator plant when the wind turbine generator plant enters a shutdown maintenance mode;
determining a maintenance wind speed corresponding to the failure, and
adjusting one of blades in the wind turbine generator plant to reach a predetermined azimuth angle and locking an impeller of the wind turbine generator plant to maintain the wind turbine generator plant in a case where the failure belongs to a first type of failure and a real-time wind speed obtained is less than or equal to the maintenance wind speed corresponding to the failure, the first type of failure comprising a failure that requires to lock the impeller for maintenance and the predetermined azimuth angle comprising one of integer multiples of 30°.

12. A maintenance apparatus for a wind turbine generator plant, comprising:
a processor, and
a memory storing computer program instructions thereon which, when executed by the processor, cause the processor to:
determine a failure of the wind turbine generator plant when the wind turbine generator plant enters a shutdown maintenance mode;
determine a maintenance wind speed corresponding to the failure, and
adjust one of blades in the wind turbine generator plant to reach a predetermined azimuth angle and locking an impeller of the wind turbine generator plant to maintain the wind turbine generator plant in a case where the failure belongs to a first type of failure and a real-time wind speed obtained is less than or equal to the maintenance wind speed corresponding to the failure, the first type of failure comprising a failure that requires to lock the impeller for maintenance and the predetermined azimuth angle comprising one of integer multiples of 30°.

* * * * *